May 31, 1927.
F. F. BLANCO
REAMER
Filed May 4, 1925
1,630,602
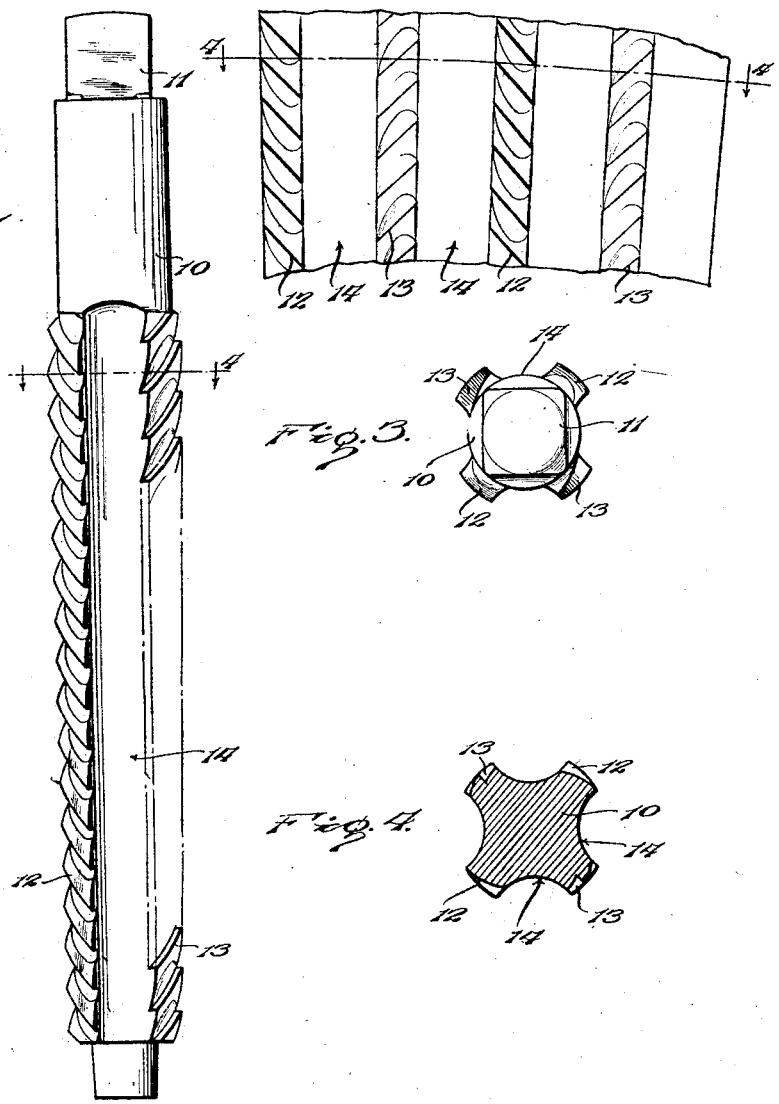
Inventor
F. F. Blanco
By Lacey, Attorneys Patented May 31, 1927.

1,630,602

UNITED STATES PATENT OFFICE.

FLORINO F. BLANCO, OF SAN JOSE, COSTA RICA.

REAMER.

Application filed May 4, 1925. Serial No. 27,970.

This invention relates to an improved reamer and seeks, among other objects, to provide a tool of this character which will function efficiently without the necessity of turning the reamer at an excessive speed.

A further object of the invention is to provide a reamer which, by reason of the peculiar character and disposition of its teeth, will cut a clean, smooth bore.

And the invention seeks, as a still further object, to provide a reamer which will provide for the free and easy clearance of the shavings so that the reamer will not stick.

Other and incidental objects will appear hereinafter.

In the accompanying drawings:

Figure 1 is a side elevation of my improved reamer.

Figure 2 is a fragmentary development or schematic view of the reamer, particularly showing the disposition of the teeth thereof.

Figure 3 is a top plan view of the tool.

Figure 4 is a transverse sectional view on the line 4—4 of Figure 1.

In carrying the invention into effect, I employ a body 10 which is gradually tapered toward its lower or forward end while at its upper or rear end the body is provided with a squared terminal 11. Outstanding from the body are four quadrantly spaced longitudinally extending rows of teeth, two of which rows are indicated at 12 while the other two rows are indicated at 13. These rows of teeth extend throughout the major portion of the length of the body and, as will be observed, the rows 12 are diametrically opposite while the rows 13 are diametrically opposite so that the rows alternate. Between the rows of teeth are concave channels 14 to accommodate the free clearance of shavings. The number of rows of teeth, as well as the number of channels and the number of teeth in each row will, of course, be determined by the length and diameter of the tool body.

Attention is now directed to the fact that, as particularly shown in Figure 2, the teeth of the rows 12 are helically inclined forwardly and downwardly while the teeth of the rows 13 are helically inclined rearwardly and upwardly. In other words, said teeth are presented in opposite directions so that while the teeth of the rows 12 are functioning to enter the work or advance the tool, the teeth of the rows 13 will function to finish the wall of the bore or opening. This finishing function of the teeth of the rows 13 is materially enhanced by the fact that, as also best shown in Figure 2, said teeth are staggered with respect to the teeth of the rows 12 so that the finishing action of the teeth of the former rows will overlap the cutting action of the teeth of the latter rows. Furthermore, the teeth of the rows 13 will tend to eject the shavings to obviate clogging so that the tool will operate with ease to both cut and finish simultaneously. All of the teeth are of the same pitch and the teeth of the rows 12 are backed off at their upper sides while the teeth of the rows 13 are backed off at their lower sides to produce a saliency to the cutting edges of the teeth.

Having thus described the invention, what I claim is:

1. A reamer comprising a body having spaced rows of teeth, the teeth of the several rows similarly inclining throughout their length, and the teeth of alternate rows inclining in a reverse direction to the teeth of the intermediate rows.

2. A reamer comprising a body provided with spaced ribs and concave channels separating the ribs, and having similarly inclined teeth upon the outer faces of the ribs, the teeth of alternate ribs inclining in an opposite direction to the teeth of the intermediate ribs.

In testimony whereof I affix my signature.

FLORINO F. BLANCO. [L. S.]